F. MYERS.

Improvement in Sad and Fluting Irons.

No. 4,362. Reissued May 2, 1871.

Witnesses.

Phil. F. Larner.

H. H. Jackson.

Inventor.

F. Myers.

By Munn & Co.

Attorney.

AM PHOTO-LITHOGRAPHIC CO. N.Y. (OSBORNE'S PROCESS.)

United States Patent Office.

FREDERICK MYERS, OF NEW YORK, N. Y.

Letters Patent No. 112,482, dated March 7, 1871; reissue No. 4,362, dated May 2, 1871.

IMPROVEMENT IN SAD AND FLUTING-IRONS.

The Schedule referred to in these Letters Patent and making part of the same.

*To all whom it may concern:*

Be it known that I, FREDERICK MYERS, of the city, county, and State of New York, have invented a new and improved Combined Sad and Fluting-Iron; and I do hereby declare that the following is a full, clear, and exact description thereof, which will enable others skilled in the art to make and use the same, reference being had to the accompanying drawing forming part of this specification.

My improvement relates to that class of combined sad and fluting-irons in which are combined a lower or sad-iron plate with an upper or handled plate provided with intervening fluted surfaces.

My invention consists in so constructing the fluting surfaces and connecting the upper and lower plates that, when the two are not rigidly connected for use as a sad-iron, the upper plate may be rocked to and fro laterally upon the fluted surface of the lower plate in order that the fabric to be fluted may be gradually subjected to the action of the fluting surfaces, and also in a novel device by which the two plates may be rigidly connected when desired for use as a sad-iron, and yet, when desired for fluting, may be readily disconnected so as to admit of the free lateral rocking of the upper plate.

Similar letters of reference indicate corresponding parts.

Figure 1:
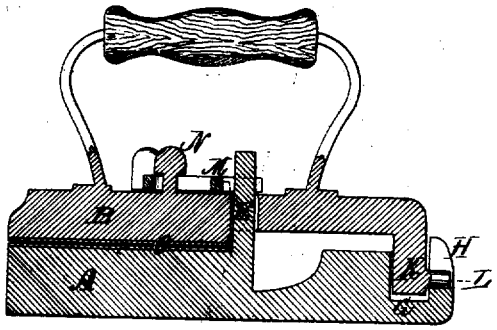
Figure 1 is a longitudinal sectional elevation of my improved combined sad and fluting-iron.
Figure 2:
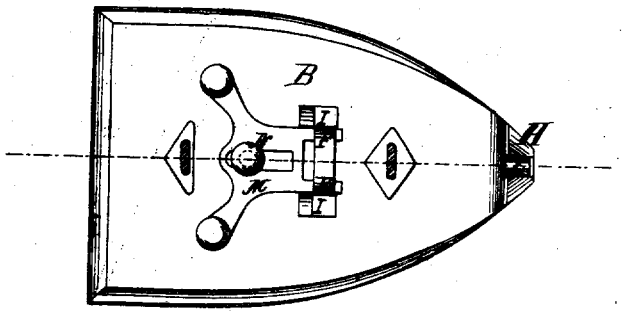
Figure 2 is a plan view of the same.
Figure 3:
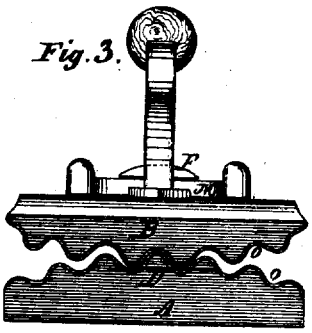
Figure 3 is an end view.

A is the lower or sad-iron plate, and

B the upper or handled plate.

Both are made of cast-iron or other desirable metal.

The plate A is shaped in the form of and finished on the bottom to correspond with the ordinary sad-iron.

The upper surface, for about half the length, is made convex and grooved or corrugated, as indicated at D.

Immediately in front of this convex-fluted part a broad stud, E, rises vertically and terminates in a cap, F, projecting over each edge.

Near the point of plate A is a deep socket, G, and in front of this a bifurcated vertical stud, H.

The lower surface of the upper plate B is convex, and is corrugated to correspond with the corrugated upper surface of the sad-iron plate.

Between the inner end of these corrugations and the point of the plate is a lateral mortise, I, extending through the plate vertically for the reception of the stud E.

The degree of convexity employed in either of the corrugated surfaces is non-essential, as the only object to be attained thereby is the gradual subjection of the fabric to be fluted to the action of the fluting surfaces, or cause the corrugations to operate on the fabric successively.

Near the point is a vertical stud, K, extending downward into the socket G; and from this stud a pivot, L, extends forward to rest and work in the bearing formed by the bottom of the bifurcation in the stud H.

M is a slotted sliding wedge, fitted to and held by a suitable guide, N, attached to the top of the upper plate in the rear of the mortise.

Its slot embraces the upward-projecting portion of the stud E, and the upper surface of each arm of the wedge engages with the under surfaces of the side projections of the cap F. When forced forward it rigidly connects the two plates, but admits of their separation when withdrawn.

O represents the corrugated sheathing, of brass or other non-corrosive metal, which I apply to these cast-metal plates for protecting the goods from rust when cast-iron is used.

When the two plates are rigidly connected they constitute a sad-iron.

When disconnected the fluted surfaces may be readily separated for the insertion of the fabric to be fluted, after which the upper plate is to be brought in contact at one edge with the corresponding edge of the lower plate and then rocked to and fro under pressure, which operation can be repeated from time to time, slipping along the fabric until all is completed.

By this means the fabric is drawn gradually into the flutes, and is not liable to be unduly stretched or torn during the process.

The pivot L may be dispensed with, and the point of the stud K may rest on the bottom of the notch G, and serve for the point of oscillation equally as well as the pivot does, while affording the same facility for detaching the two parts.

I am aware that it is not new to make convex-fluted or corrugated fluting-plates, to be worked by oscillating one on the other, and I do not, therefore, claim such broadly; but

Having thus described my invention,

I claim as new and desire to secure by Letters Patent—

1. The improved sad and fluting-iron, consisting of the sad-iron plate A, handled plate B, with intervening fluting surfaces sufficiently convex to admit of a free lateral rocking movement of the upper plate, while bearing upon the fluted surface of the lower plate, and a device for rigidly connecting the two, substantially as and for the purposes specified.

2. The vertical capped stud E and wedge M, in combination with the upper and lower plate of a combined sad and fluting-iron, substantially as and for the purposes specified.

FREDERICK MYERS.

Witnesses:

JAS. ATKINSON,

F. A. VAN RENSSELAER.